United States Patent [19]
Shavit

[11] Patent Number: 6,078,843
[45] Date of Patent: Jun. 20, 2000

[54] NEURAL NETWORK INCLUDING INPUT NORMALIZATION FOR USE IN A CLOSED LOOP CONTROL SYSTEM

[75] Inventor: Gideon Shavit, Highland Park, Ill.

[73] Assignee: Honeywell Inc., Minneapolis, Minn.

[21] Appl. No.: 08/787,729

[22] Filed: Jan. 24, 1997

[51] Int. Cl.⁷ .................................................... G05B 13/02
[52] U.S. Cl. .............................................. 700/48; 700/42
[58] Field of Search ................................ 702/23; 706/23, 706/25, 903, 906; 700/48, 42, 40, 41, 52

[56] References Cited

U.S. PATENT DOCUMENTS

| | | | |
|---|---|---|---|
| 5,159,660 | 10/1992 | Lu et al. . | |
| 5,396,415 | 3/1995 | Konar et al. | 364/162 |
| 5,442,926 | 8/1995 | Kawai et al. | 364/162 |
| 5,486,996 | 1/1996 | Samad et al. | 364/152 |
| 5,586,221 | 12/1996 | Isik et al. | 706/23 |
| 5,625,552 | 4/1997 | Mathur et al. | 364/162 |

*Primary Examiner*—William Grant
*Assistant Examiner*—Steven R. Garland
*Attorney, Agent, or Firm*—Robert B. Leonard

[57] ABSTRACT

An apparatus and method for controlling a process using a neural network which operates as part of a closed loop control system. The state of the control system is defined by one or more process condition signals and monitored for a predetermined set of controller parameters. The output of the control system is one or more device control signals, used by a control device to alter a process being controlled. The neural network uses normalized values of process condition signals in combination with a predetermined set of controller parameters to produce correction control signals. The correction control signals are then used to the create device control signals. Proper normalization of at least one of the process condition signals using the throttling range set by the controller parameters is necessary. The remaining input signals must be normalized as well, but the method of normalization is not as critical, except to create a common range for all process condition signals input to the neural network.

10 Claims, 5 Drawing Sheets

NEURAL NETWORK INCLUDING INPUT NORMALIZATION FOR USE IN A CLOSED LOOP CONTROL SYSTEM

BACKGROUND OF THE INVENTION

This invention relates to the field of nonlinear controllers and is particularly adapted to augment conventional Proportional-Integral-Derivative (PID) controllers so that they function more effectively for controlling time varying dynamic processes and systems.

Controllers are inherently complex since they control dynamically changing systems, trying to match a desired response with the system output. (The desired response can be a setpoint change or the output curve of a reference model exhibiting the desired response characteristics.) In most real control situations, one would not expect, and cannot achieve, the process output being brought to setpoint instantaneously. Therefore, following the presumed optimal curve is the goal.

Both by virtue of and despite their simplicity, linear controllers continue to be the workhorse of control applications. In particular, the vast majority of current applications employ proportional-integral-derivative (PID) controllers. In the aerospace as well as process industries, PID control has proven to be easy to use and to provide adequate performance. PID controllers are also general purpose, that is, the same controller structure can be used for a broad range of applications.

Yet PID control is far from ideal. For any nontrivial application, we know that nonlinear controllers can substantially outperform a PID. For specific plants, high-performing nonlinear controllers can be designed. But, in practice, this has required unique designs for each enterprise, with concomitant high cost and complexity.

Neural Networks have recently been shown to provide a highly effective replacement or supplement for PID controllers, providing nonlinear control without the usual expense and complexity of such nonlinear control systems. U.S. Pat. No. 5,396,415 to Konar et al. for example, describes a control system which uses a neural network to supplement PID control. U.S. Pat. No. 5,159,660 to Lu et al. applies neural network technology as a stand-alone replacement for PID control. The applicant has discovered that the effectiveness and versatility of these systems may be advanced even beyond the contemplation of the authors of these references. As will be shown, a control system including a neural network using normalization techniques described herein will allow a trained neural network to be used in control applications other than the one it was trained for, with excellent results. The applicant's invention, also makes more effective use of the control devices used to alter the process by ensuring that full operating range of associated control devices are effectively used.

PID controllers are used ubiquitously in conventional control systems. As conventionally formulated, these PID controllers use six input signals to generate an output which drives the application process. The input signals represent on the one hand, controller parameters (or gains) $K_P$, $K_I$ and $K_D$ and, on the other, three error signals or process condition signals: the error between the setpoint or reference model response and the process response, $e$, the integral of this error, $\int e$, and the derivative of this error, $\dot{e}$. This function computed by conventional PID controllers is a linear weighted sum of the error signals:

$$u_{PID} = K_P e + K_I \int e + K_D \dot{e}$$

It may be computed either in analog or digital fashion to yield $u_{PID}$. As indicated, $K_P$, $K_I$ and $K_D$ are controller parameters, or gains. Their values uniquely determine controller response characteristics. In the conventional PID paradigm, it is assumed that by increasing the proportional gain $K_P$, we can increase the closed loop bandwidth (reducing the time needed to attenuate disturbances); by increasing the derivative gain $K_D$ we can increase the damping (reducing overshoot); and by increasing the integral gain $K_I$ we increase the system robustness (reducing sensitivity to disturbances) and reduce steady-state tracking errors. The behavior of the closed loop system (dynamic system), however, does not always decouple in this way. That is, increasing integral gain may reduce damping, or increasing proportional feedback can increase sensitivity, etc. In practice, the user installs a PID controller box in a feedback loop and adjusts the gains until the closed loop response of the system is a good compromise among the user's competing objectives.

There is no theoretical reason to believe that this is the optimal function of these six quantities. In fact, in many applications, it is unlikely to be the optimal solution, since the optimal solution is non-linear, or a series of linear solutions, optimal for a given range of conditions. Therefore, conventional PID controllers are not as good as they could be if the larger search space of linear and nonlinear functions was available for control solutions.

The neural network provides a way of searching through a larger solution space for the best possible control solution. In a similar manner to the PID controller, the neural network is provided with input stimulus, and the weights internal to the neural network are adjusted to achieve a good compromise among the user's competing objectives. Since the neural network is not limited to linear solutions for the controller response, a significantly larger number of solutions are available for controlling the process.

The ubiquitous use of linear control systems to adequately provide control solutions suggests that they at least do a fair job of control in many applications. In these cases, the PID may simply need a supplemental device, such as a neural network, to "tweak" the PID result. In other cases, a given application may have linear and nonlinear areas of operation, and in these cases, the PID controller and the Neural Network may alternately dominate the process control, based on the characteristics of the control situation. In still other cases, the application to be controlled will have very little linear characteristics, and thus a stand-alone neural network may provide the best control solution. Regardless of the control arrangement in which the neural network operates in however, PID parameters provide a useful means to describe system activity and performance.

In either a combination PID/ neural network system, or a straight PID system, signals which reflect the state of the process, or process condition signals $(e, \int e, \dot{e})$, may not be uniform in magnitude, and may vary both positive and negative. Ideally, the neural network should be capable of compensating for these weight differences by sufficient training. In reality, a neural network may not be trained indefinitely, and eventually reaches a point of diminishing returns. If the weights of the neural network do not compensate for the magnitude differences during this time, an imperfect control solution may occur. Furthermore, training performed for one type of control environment will be tailor-made for that environment because of the arbitrary weights. The trained neural network will perform poorly when used for another control application unless the range of the process variables in the new control application is similar to that of the control application the neural network was trained with.

Proper normalization for neural network input signals simplifies the neural network's task, and consequently improves its ability to learn how to control. Thus, a controller providing the best possible control solution, and capable of performing effectively in control applications other than the one it was trained for is achieved. Normalization also allows the most effective utilization of the control devices used to alter the process by maximizing their full range of operation. Overall, we show that neural networks can provide some of the most versatile, effective nonlinear control systems presently available.

Versatility in a control system is almost always a benefit to a control system designer. The applicant's invention will allow the designer to contemplate use of a single controller for numerous applications, without requiring training for each application. It may even allow simultaneous use of a single control system for numerous applications, having substantially different non-linear characteristics. In principle, existing systems can even be retrofitted with the applicant's system, requiring no retraining, and, in fact, in many cases may produce better control results than the original control system.

SUMMARY OF THE INVENTION

The invention described herein is an apparatus and method for controlling a process using a neural network which operates as part of a closed loop control system. The state of the control system can be defined by one or more process conditions, expressed as process condition signals or variables. The characteristics of the process control are defined by a predetermined set of controller parameters. The controller parameters may, for example, be parameters representative of overshoot or oscillation (such as $K_P$ or $K_I$). The output of the control system is one or more device control signals, to be used by a control device capable of altering the process to be controlled.

The input signals to the neural network include all or some of the process condition signals and the controller parameters, which have been normalized before processing by the neural network. The neural network produces correction control signals from these values. The correction control signals are thereafter used wholly or in part to create the device control signals. Proper normalization of the input signals is a critical aspect of the control method. Normalization of at least one of the process condition signals using the throttling range set by the controller parameters is necessary The other input signals must be normalized as well, but the method of normalization is not as critical. Overall normalization however, must cause all input signals, as seen by the neural network, to vary in an identical range.

In a preferred embodiment of the invention, the neural network operates in parallel with a PID controller. The PID controller produces primary control signals based on a set, or subset of, the standard PID controller parameters ($K_P$, $K_I$, $K_D$) and, process condition signals $(e, \int e, \dot{e})$. The primary control signals from the primary controller and the correction control signals from the neural network are then combined to produce the device control signals which are used to control the process.

A method in accordance with the present invention can be understood by direct application of the above description of the apparatus.

DETAILED DESCRIPTION OF THE INVENTION

Figure 1:
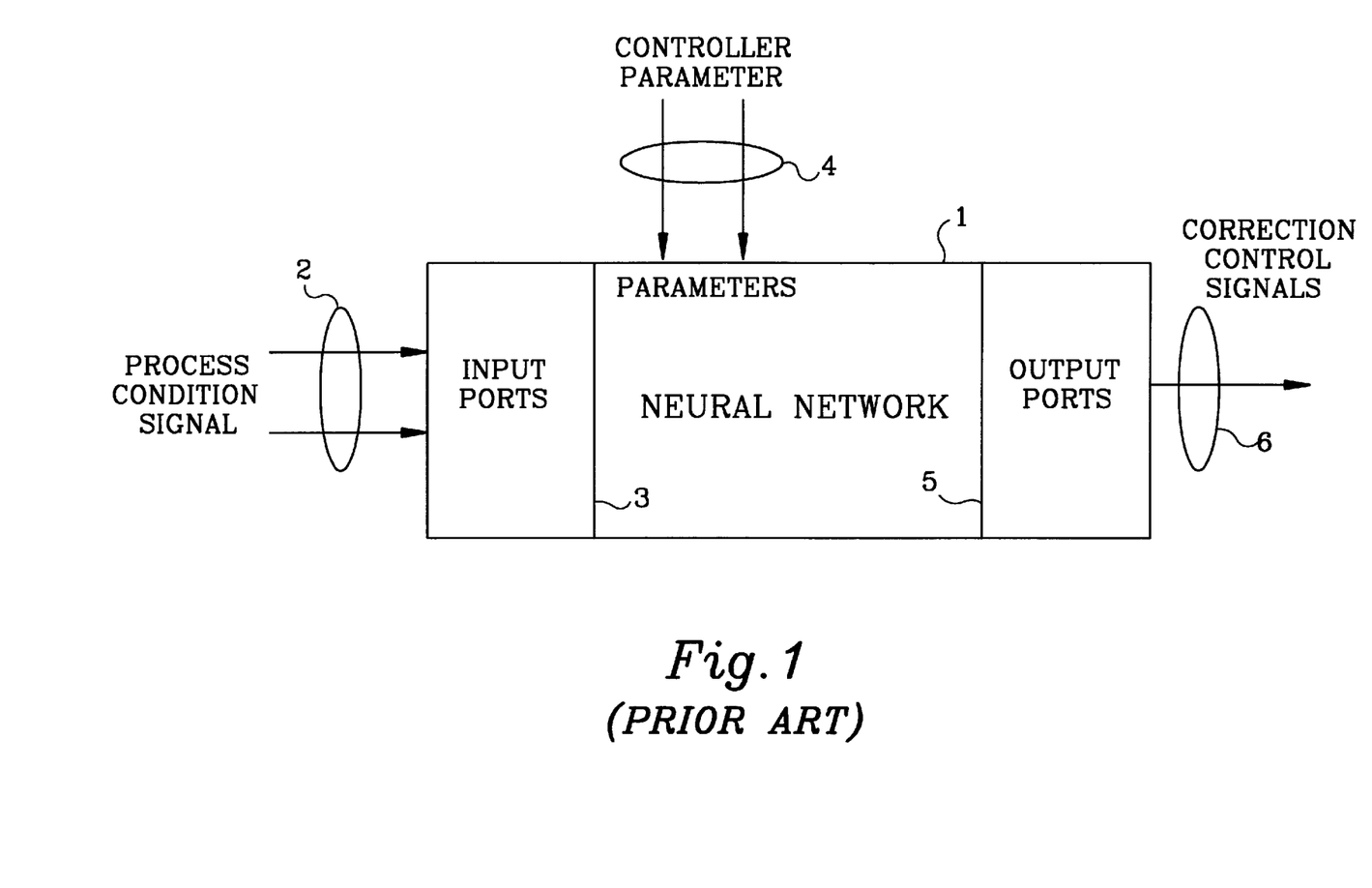
FIG. 1 shows the basic concept block for a neural network, as used in a control setting.

FIG. 1 shows a typical neural network 1 applied in control applications. Input signals, identified as process condition signals 2, are applied to input ports 3 of the neural network. The process condition signals provide information about a process to be controlled. These signals can be created for example using data from sensors or other similar devices, and reflect differences between desired conditions in the process, and the actual conditions in the process. One or more parameters, identified as controller parameters 4 are also provided to the neural network. The controller parameters dictate the characteristics of the neural network's response to process condition signals 2. The controller parameters may reflect, for example, overshoot or oscillation of the process. The output ports 5 of the neural network supply one or more correction control signals 6 to a device which is used to alter the process. Alternatively, the correction control signals may be passed to other parts of the control system for further processing before being sent to the device used to alter the process. The device or devices used to alter the process may be referred to as control devices. In physical terms, common control devices might be an actuator and valve, or a heating element.

While the control system has been described in terms of input and output control signals, it should be understood that the system may actually be implemented in software, using variables, rather than physical signals. This difference does not effect to overall concept of the invention however.

The process condition signals, and the controller parameters, if they are supplied, may have various ranges. In a typical case, the process condition signals include the difference or error between the actual process condition signals of the process, and the desired process condition signals of the process. For example, in a system monitoring a process for temperature, the desired temperature condition for the process may be 10° C., and the actual temperature 15° C., giving a 10° C.–15° C.=–5° C. difference signal. The difference signal is usually identified as e, and is referred to as the error. A second process condition signal may be an integral of the error signal, or $\int e$. The integral error signal has different units from the error signal, and may have a different range of values which are substantially larger or smaller than the range of values for the error signal. The difference between the range of these two common input signals is typical of control system input signals. Independent of the actual signals provided, process condition signals will have significantly different ranges of input values. These range differences are essentially arbitrary and typically provide no useful information to the control system.

Thus, without some preprocessing of the process condition signals applied to the neural network, the input signals essentially have an arbitrary weighting factor associated with them. Since the neural network operates by weighting the input signals and combinations of the input signals to produce the correction control signals, these weighting factors directly effect initial training of the neural network (selection of weights) and later operation of the neural network.

Removal of these arbitrary weights prior to processing (or normalization) of the input signals by the neural network would thus improve overall system performance by reducing training time, or in some cases, allowing proper training to occur where it was not possible before. It also makes the training of the neural network independent of the particular controller devices and process condition parameters, since regardless of the devices connected to the neural network, the same range of normalized values is provided at the inputs.

The common method of normalizing process condition signals uses maximum and minimum values of a particular process range as normalization factors. For the process range, $p_{max}$ & $p_{min}$, may represent the maximum and minimum process temperature possible in the process, respectively. Thus the error, e, if it is one of the input signals to the neural network, may be normalized to a value, e', by:

$$e' = \frac{e - p_{min}}{p_{max} - p_{min}},$$

which will lie between zero and one. Normalization to a value between 0 and 1 is not necessary, but the range of 0 to 1 is a convenient choice, since all input signals to the neural network must be normalized to an identical range.

An arbitrary choice for the normalization factors will not produce the best possible control solutions however. It has been found that in fact, the neural network should be normalized with respect to the throttling range set by the controller parameters. Throttling range in practical terms reflects the bandwidth of a control system, and is typically supplied via $K_P$, the proportional gain for the error in the system. Throttling range (TR) is the range of values which determine the control device's minimum and maximum positions. In other words, the maximum and minimum errors $Er_{min}$, $Er_{max}$, which the system can correct for.

As a practical example of why normalization by the throttling range is necessary, consider first a system in which normalization is not performed using the throttling range set by the controller parameters, but rather using the process range, as indicated by the process condition signals. For this example we will use error from setpoint, or e, as our input signal. A setpoint of 25° C., and an actual temperature of 20° C., would produce an error signal at the input to the neural network, of: e=25° C.−20° C.=5° C. If, we assume a process range of 0° C. to 100° C., the normalized value of e, e' would be:

$$e' = \frac{5 - 0}{100 - 0} = 0.05.$$

In as similar manner, the same setpoint and an actual temperature of 21° C. would produce an e'=0.04.

Assuming the same process as specified above, but instead of using the process range for normalization, the throttling range set by the chosen controller parameters is used, e' for 20° C. becomes:

$$e' = \frac{5 - Er_{min}}{Er_{max} - Er_{min}} = \frac{5 - Er_{min}}{TR}$$

Assuming $Er_{min}$ of −5° C. and $Er_{max}$ of +5° C. (throttling range of 10° C.) provides:

$$e' = \frac{5 - (-5)}{10} = 1.0$$

and e' for 21° C., would produce an e'=0.9. (This would correspond, for example, to a $K_P$ of $\frac{1}{10}$° C.)

Thus, for the same range of temperature change (20° C. to 21° C. or 1° C.) using the throttling range for normalization causes a 10% change in control system response, while the process throttling range produces only a 1% change in control system response. By using the throttling range set by the controller parameters instead of the process range, immediate reaction of the control system to the process is increased by a factor of 10. This reaction, as one will note, will depend on the chosen throttling range set by the controller parameters. As the throttling range is increased toward the process range, the degree of immediate reaction will decrease. Too small a throttling range, on the other hand may lead to oscillation. In any event, for typical control systems the throttling range will typically have a smaller range than the overall process. Thus, normalization by the throttling range rather than the process range markedly increases immediate controller reaction. Normalization by throttling range thus couples this reactivity into the neural network, causing the neural network to be tailored to this factor. As a second advantage of using the throttling range as the normalization factor, it prevents coupling of the neural network to the process range, which allows the neural network to better adapt to different process having different ranges since the control solution is independent of process range.

Figure 1A:
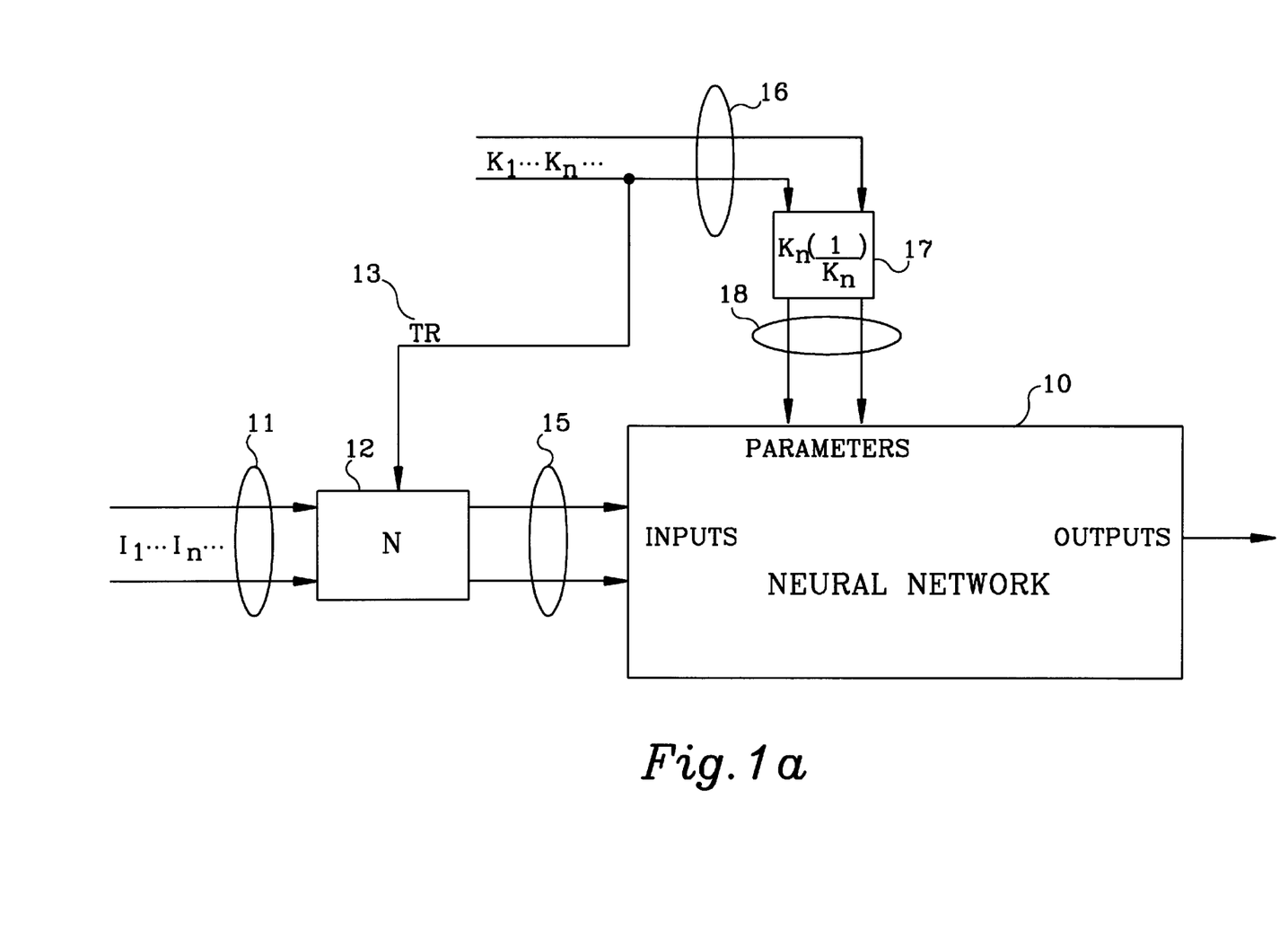
FIG. 1a shows normalization, contemplated by the applicant's invention.

FIG. 1a shows a block diagram for a neural network 10 receiving the normalized input signals as described above. A series of process condition signals 11, are passed through normalization device 12. The normalization device normalizes the process condition signals 11 to a common range. This range typically being 0 to 1. At least one of the input signals will be normalized using throttling range 13, set by the controller parameters 16. The process condition signals are then passed into the neural network as normalized process condition signals 15.

Normalization of the controller parameters 16 is also desirable. Normalizing at a neutral or advantageous set of controller parameters provides a maximized range about this normalized set of controller parameters for user adjustment. The controller parameters may then be modified during normal operation, for example, if a particular application or situation requires different controller characteristics from those used during training. As indicated at 17 in FIG. 1a, the controller parameters may be normalized by themselves to produce the normalized controller parameters 18. The normalization of the process condition signals must, of course, be done using the unnormalized values for the controller parameters.

Figure 2:
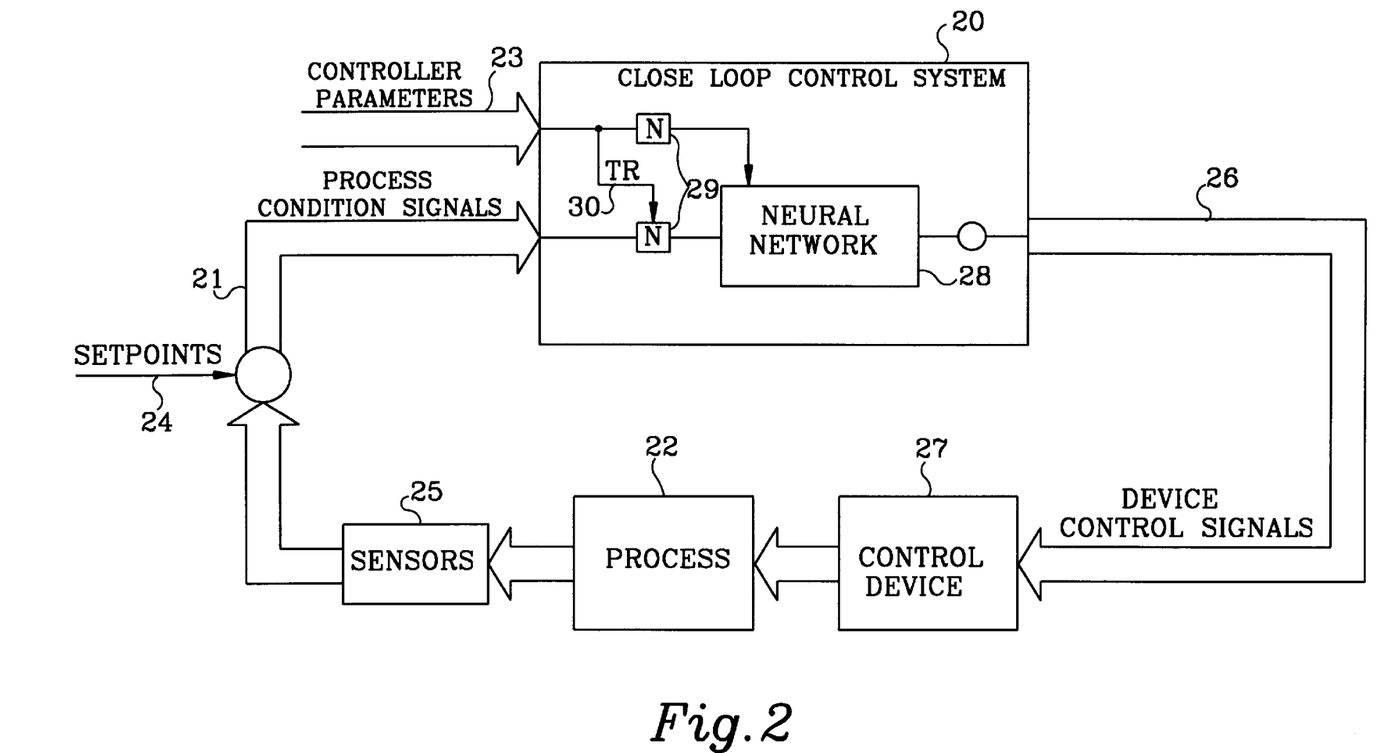
FIG. 2 depicts a block diagram of the applicant's invention, using a stand-alone neural network controller.

A block diagram for invention is shown in system implementing the applicant's invention is shown in FIG. 2. Closed loop control system 20 receives process condition signals 21, which reflect the condition of process 22, and predetermined controller parameters 23, which define controller response to the process condition signals. The process condition signals are calculated values which reflect deviation of measured process variables from the desired value of those process variables. Generally, the process condition signals represent deviations from chosen setpoints 24. Sensor 25 or other device is used to measure the process variables. The sensor values are thereafter used to calculate process condition signals 21 by comparing the measured process variables with the desired value of those process variables.

It should be understood that many of the devices identified in this description may actually be implemented in software, or in combined devices. These implementations will not however, effect the overall concept of the invention.

Control system 20 produces device control signals 26 which operate control device 27. Control device 27 alters the process being controlled, and may comprise, for example, an actuator and valve arrangement which alters fluid flow. A neural network 28, as part of control system 20 receives the process condition signals, normalized to a common range, as indicated by blocks 29. At least one of the process condition signals is normalized by the throttling range 30 set by the controller parameters. The neural network, using the normalized process condition signals, produces one or more correction control signals which are used either alone, or in conjunction with other signals, to produce device control signals 26.

For control systems in the HVAC area, acceptable control of numerous process applications can be achieved using only the error and integral error signals as the process condition signals. Thus, the controller parameter terms would consist of the proportional and integral gain, and the throttling range would be provided by the proportional gain. It has been found that only error need be normalized by the throttling range for effective control using this configuration. The integral error signal may be normalized in other manners of choice.

Figure 3:
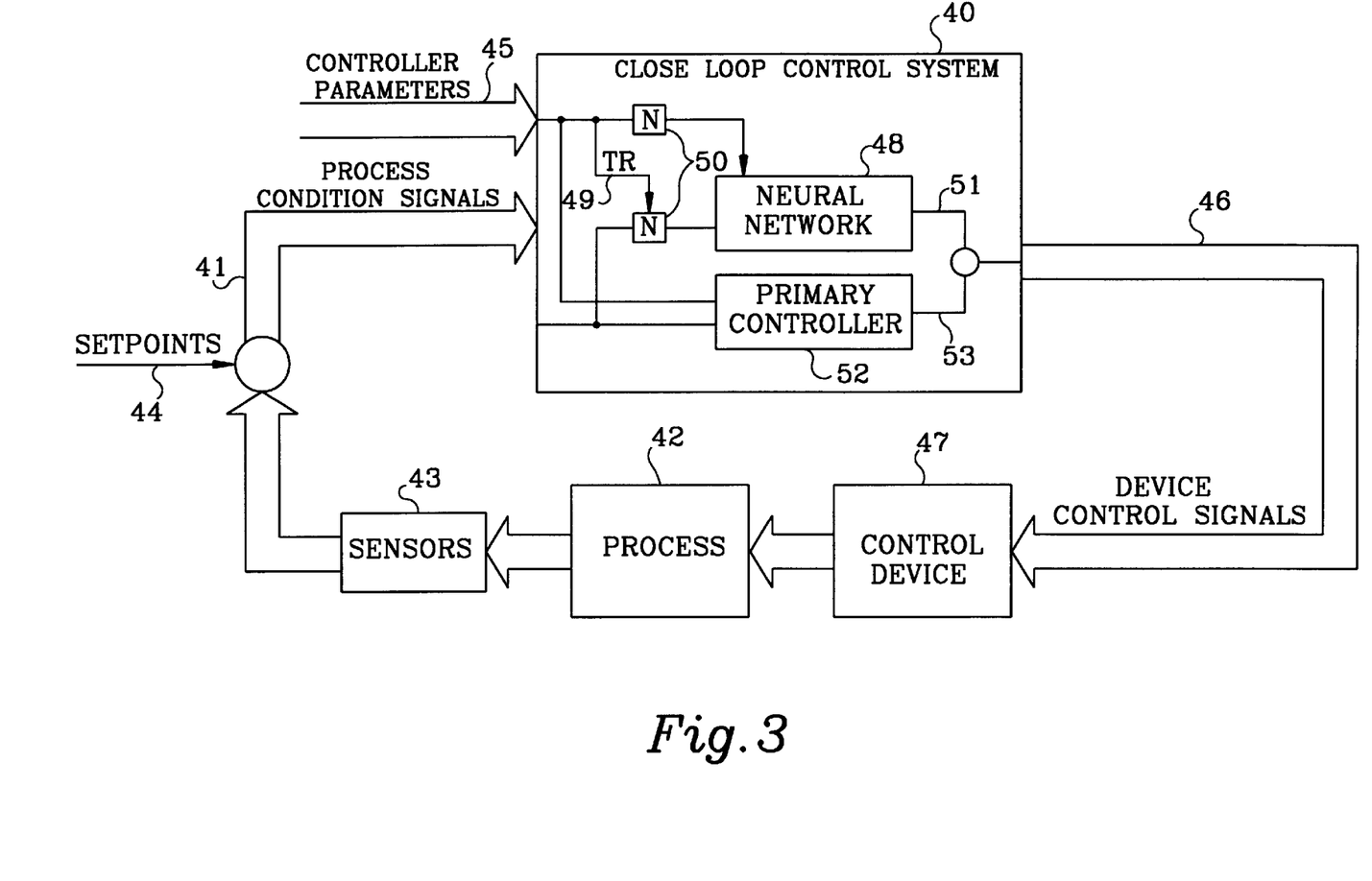
FIG. 3 depicts a block diagram of the applicant's invention using the neural network controller in combination with another controller.

FIG. 3 shows use of the applicant's neural network design in a control system utilizing a primary controller working in concert with the neural network controller. A closed loop control system 40 receives process condition signals 41 from a process 42. The process condition signals are created using measured systems variables created by, for example signals from sensor 43, and a setpoint 44. A set of controller parameters 45, define the characteristics of the response of the control system to the process condition signals. The control system produces device control signals 46 which cause control device 47 to modify the process being monitored.

A neural network 48, as part of control system 40 receives the process condition signals and controller parameters, normalized by the throttling range 49. As indicated by blocks 50, the throttling range is set by the controller parameters. The neural network, using the normalized process condition signals and controller parameters, produces correction control signals 51, which in whole or part make up device control signals 46 passed by the control system to control device 47. A primary controller 52 receiving all or some of the controller parameters and the process condition signals, produces primary control signal 53. The primary control signals may then be combined with correction control signals 51 from the neural network to produce the device control signals 46.

As with the stand-alone neural network control system, effective control has been found using as controller parameters the error signal and the integral error signal as the process condition signals. The proportional gain and integral gain are thus provided as controller parameters, with the throttling range provided by the proportional gain. In this configuration, normalization of only the error signal by the throttling range is necessary. The other input signals and controller parameters may be normalized as desired for a particular application.

Figure 4:
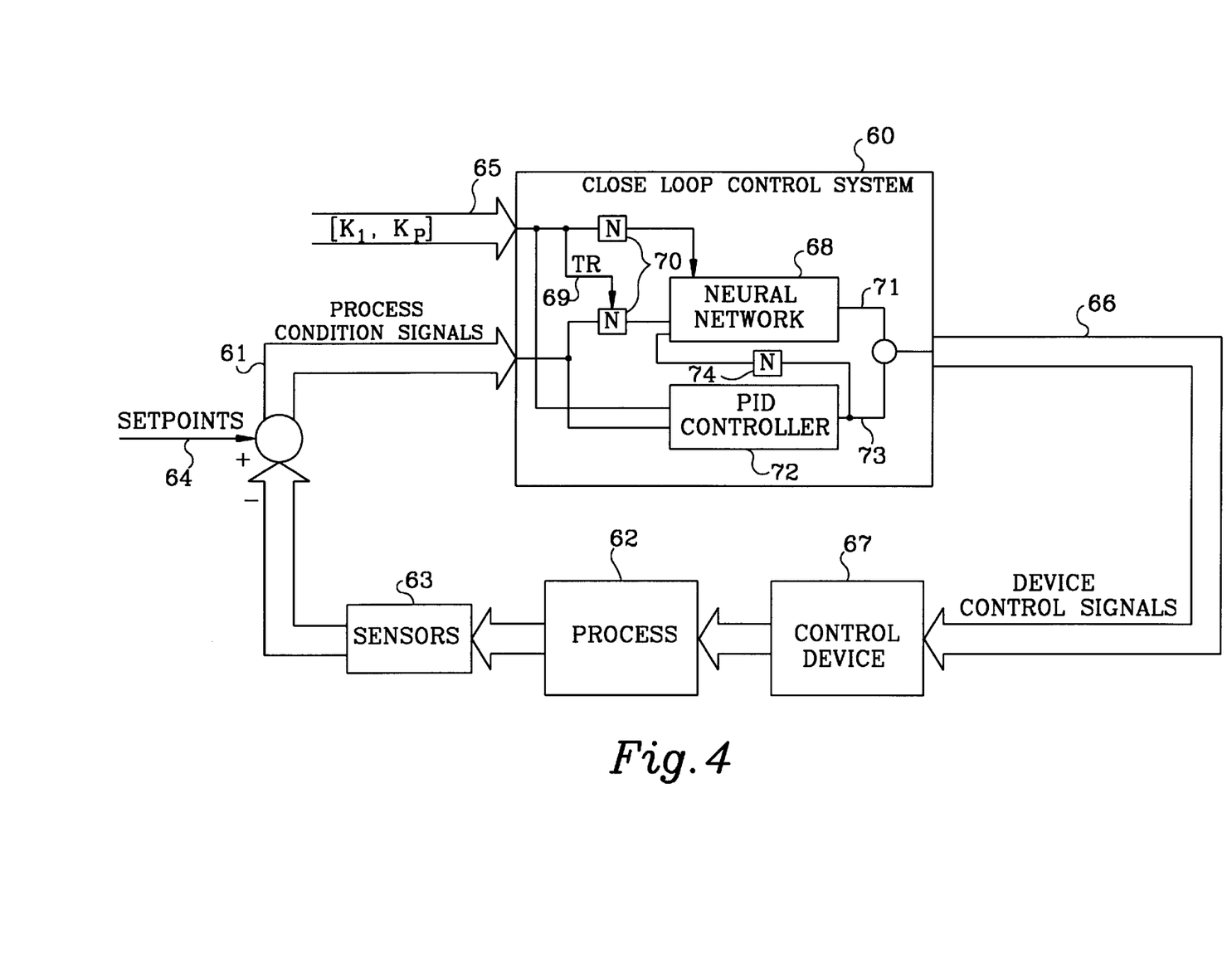
FIG. 4 depicts a block diagram of the applicant's invention using the neural network controller in combination with a PID controller, including feedback from the PID controller to the neural network controller.

In a particularly preferred embodiment of the applicants invention, the primary control signals from the primary controller may be provided as process condition signals to the neural network. As shown in FIG. 4, a closed loop control system similar to that shown in FIG. 3 is used. In this embodiment, a closed loop control system 60 receives process condition signals 61 from a process 62. The process condition signals having been created from measured systems variables from, for example, signals from a sensor 63, and a setpoint 64. A set of controller parameters including $K_I$ and $K_P$, identified at 65, define the characteristics of the response of the control system to the process condition signals. The control system produces device control signals 66 which cause control device 67 to alter the process being controlled. A neural network 68, as part of control system 60 receives normalized process condition signals, some having been normalized by throttling range 69, set by the controller parameters, as indicated by blocks 70. The neural network, using the normalized process condition signals, produces correction control signals 71, which in part, make up the device control signals passed by the control system to control device 67. A PID-type controller 72 receiving the controller parameters and the process condition signals, produces primary control signals 73. The primary control signals are then combined with correction control signals 71 from the neural network to produce device control signals 66. The primary control signals from the PID controller are also applied as process condition signals to the neural network in this embodiment. The primary control signals should also be normalized before processing by the neural network, as indicated by block 74.

It should be understood that various alternatives to the embodiments of the present invention described herein can be employed in practicing the present invention. It is intended that the following claims define the scope of the present invention and that structures and method within the scope of these claims and their equivalents be covered thereby:

What is claimed is:

1. A neural network operating as part of a closed loop control system, the closed loop control system providing device control signals to a control device for altering a process, the process defined by one or more process condition signals, and monitored for a predetermined set of controller parameters having a throttling range comprising:

plurality of input ports for receiving input signals representing one or more of the process condition signals; and, one or more outputs ports for providing correction control signals, the correction control signals being produced based on a normalized value for both the input signals and said predetermined set of controller parameters, at least one of the input signals being normalized to the throttling range set by the controller parameters, the correction control signals produced by the neural network being used to create the device control signals.

2. The neural network of claim 1 wherein the predetermined set of controller parameters comprise gain parameters related to error and integral error for one or more of the process condition signals, and the input signals received at the input ports represent at least error and integral error for one or more of the process condition signals.

3. The neural network of claim 2 wherein the error is normalized to the range of operation of the control device.

4. A closed loop control system providing device control signals to a control device for controlling a process, the process defined by one or more process condition signals, and monitored for a predetermined set of controller parameters having a throttling range comprising:

neural network comprising a plurality of input ports for receiving input signals representing at least one or more of the process condition signals and, one or more outputs ports for providing correction control signals, the correction control signals being produced based on a normalized value for both the input signals and said predetermined set of controller parameters, at least one of the input signals being normalized to the throttling range set by the controller parameters, the correction control signals produced by the neural network being used in part to create the device control signals; and, a primary controller producing primary control signals based on the process condition signals and the predetermined set of controller parameters, the primary control signals produced by the primary controller being used in conjunction with the correction control signals to produce the device control signals.

5. The closed loop control system of claim 4 wherein:

the input signals to the neural network include the one or more of the primary control signals.

6. The closed loop control system of claim 5 wherein:

the primary controller is a PID controller; and, the predetermined set of controller parameters comprise parameters related to integral error gain and proportional error gain for one or more of the process condition signals, and the process condition signals represent proportional and integral error.

7. The closed loop control system of claim 5 wherein the error is normalized to the range of operation of an control device.

8. A method of controlling process in a closed loop control system defined by one or more process condition signals and monitored for a predetermined set of controller parameters, the closed loop control system sending device control signals to a control device for controlling the process, comprising the steps of:

collecting data on one or more process condition signals;

applying a normalized value of the collected data to a neural network, the normalized value based upon a throttling range set by the controller parameters; and producing a correction control signal based on a determination by the neural network of a proper control response using the applied process condition signals and the predetermined set of controller parameters.

9. The method of controlling a process of claim 8 comprising the further steps of:

applying the collected data from the one or more process condition signals to a primary controller;

producing primary control signals based on a determination by the primary controller of the proper control response; and combining the primary control signals and a correction control signals to produce the device control signals, whereby the device control signals represent the primary control signals adjusted by the correction control signals.

10. The method of controlling a process of claim 9 wherein:

the primary controller is a PID controller;

the process condition signals received by the primary controller represent error and integral error; and, the predetermined set of controller parameters reflect integral and proportional error gains.

* * * * *